United States Patent
Huang et al.

(10) Patent No.: US 7,333,263 B2
(45) Date of Patent: Feb. 19, 2008

(54) TRANSITION METAL DOPED FIBER AMPLIFIER

(75) Inventors: Sheng-Lung Huang, Kaohsiung (TW); Chia-Yao Lo, Kaohsiung (TW); Kwang-Yao Huang, Kaohsiung (TW); Jian-Cheng Chen, Kaohsiung (TW); Chiang-Yuan Chuang, Kaohsiung (TW); Chien-Chih Lai, Kaohsiung (TW); Yen-Sheng Lin, Kaohsiung (TW); Ping-Hui Sophia Yeh, San Jose, CA (US)

(73) Assignee: National Sun Yat-Sen University, Kaohsiung (TW)

( * ) Notice: Subject to any disclaimer, the term of this patent is extended or adjusted under 35 U.S.C. 154(b) by 22 days.

(21) Appl. No.: 11/039,822

(22) Filed: Jan. 24, 2005

(65) Prior Publication Data

US 2006/0164717 A1 Jul. 27, 2006

(51) Int. Cl.
*H01S 3/00* (2006.01)
(52) U.S. Cl. ........................... 359/341.1; 372/6
(58) Field of Classification Search ............ 359/341.5, 359/341.1; 372/6
See application file for complete search history.

(56) References Cited

U.S. PATENT DOCUMENTS

| | | | |
|---|---|---|---|
| 4,955,025 A * | 9/1990 | Mears et al. | 372/6 |
| 5,140,658 A * | 8/1992 | Sunshine | 385/49 |
| 5,805,332 A | 9/1998 | Gopinath | |
| 6,297,179 B1 * | 10/2001 | Beall et al. | 501/5 |
| 6,404,788 B1 * | 6/2002 | Choi et al. | 372/39 |
| 6,515,795 B1 | 2/2003 | Dejneka et al. | |
| 6,556,757 B2 * | 4/2003 | Ellison et al. | 385/127 |
| 6,583,927 B2 * | 6/2003 | Choi et al. | 359/341.5 |
| 6,646,796 B2 | 11/2003 | Song et al. | |
| 6,698,246 B1 * | 3/2004 | Beall et al. | 65/390 |
| 6,904,219 B1 * | 6/2005 | Fermann | 385/130 |

FOREIGN PATENT DOCUMENTS

JP 06196788 A * 7/1994

* cited by examiner

*Primary Examiner*—Mark Hellner
(74) *Attorney, Agent, or Firm*—Bacon & Thomas PLLC

(57) ABSTRACT

An optical amplifier includes an optical fiber having a core doped with transition metal ions, and at least one glass cladding enclosing the core. By using the fiber, the optical amplifier of the invention has a gain bandwidth of more than 300 nm including 1300-1600 nm band in low-loss optical communication.

13 Claims, 2 Drawing Sheets

US 7,333,263 B2

TRANSITION METAL DOPED FIBER AMPLIFIER

BACKGROUND OF THE INVENTION

1. Field of the Invention

The present invention relates generally to optical fiber amplifiers, and more particularly to a fiber amplifier having a core doped with transition metal.

2. Description of the Related Art

Many types of optical fiber amplifiers are known in the art and are suitable for various optical communication bands.

U.S. Pat. No. 6,646,796 disclosed a wide band erbium-doped fiber amplifier. It connected two erbium-doped fiber amplifiers to achieve a super wide band amplifier. The first erbium-doped fiber amplifier pumped by a 980 nm laser diode was used to amplify the input optical signal of the C-band, which has a wavelength ranging from 1530 nm to 1560 nm. The second erbium-doped fiber amplifier pumped by a 1480 nm laser diode was used to amplify the input optical signal of the L-band, which has a wavelength ranging from 1570 nm to 1600 nm.

The disadvantage of the above-mentioned U.S. patent is that the band of the optical signal that can be amplified falls only in the C-band and the L-band, which has a bandwidth shorter than 80 nm. This bandwidth is only a part of a 300 nm bandwidth used in the optical communication. Besides, it needs two erbium-doped fiber amplifiers and two pumping lasers of different wavelength, which increase the cost of the system.

U.S. Pat. No. 6,515,795 disclosed a thulium-doped fiber amplifier. The fiber has a borosilicate glass material cladding and a core comprising a germinate glass material doped with $Tm^{3+}$. It can amplify the optical signal of 1400-1540 nm with a pumping source. The pumping source used in the amplifier is a semiconductor laser, having essentially a wavelength of 780-800 nm.

The disadvantage of the above-mentioned amplifier is that the melting point of the fiber with borosilicate glass material cladding is about 800° C. such that the fiber cannot be connected by fusion to the present fused silica fiber that has a melting point of 1600° C. It increases the system cost by using additional optical elements or mechanical structures as optical couplers. In addition, the bandwidth of the optical signal that can be amplified is about 160 nm, which does not cover the whole 300 nm bandwidth of the optical communication.

U.S. Pat. No. 5,805,332 disclosed a praseodymium-doped fiber amplifier. The fiber has a fused silica cladding and a core comprising zirconium dioxide doped with praseodymium ion. The fiber amplifier is well suited for use in the 1300 nm band when pumped with an optical source having a wavelength of about 1000 nm. However, the 1300 nm band does not cover the whole band in the optical communication.

SUMMARY OF THE INVENTION

The primary objective of the present invention is to provide a transition metal doped fiber amplifier, which has a gain bandwidth of more than 300 nm including the 1300-1600 nm band used in optical communication.

To achieve the objective of the present invention, an optical fiber amplifier provided by the present invention comprises an optical fiber having a core doped with transition metal ions, and at least one glass cladding enclosing the core. By using the fiber, the optical fiber amplifier of the invention has a gain bandwidth of more than 300 nm including the 1300-1600 nm band used in low-loss optical communication.

DETAILED DESCRIPTION OF THE INVENTION

A transition metal doped optical fiber amplifier in accordance with the present invention essentially comprises a fiber doped transition metal ion such as $Cr^{4+}$, $V^{3+}$, $Ni^{2+}$, or etc. The fiber provided in the preferred embodiment of the present invention is a double-clad crystal fiber doped with chromium. The method of making the fiber according to the present invention comprises a first step of growing a $Cr^{4+}$:YAG crystal fiber having a diameter of 68 μm by using the laser-heated pedestal growth (LHPG) method, and a second step of obtaining a double-clad crystal fiber enclosed by fused silica by using codrawing laser-heated pedestal growth (CDLHPG) method.

Figures 1, 2:
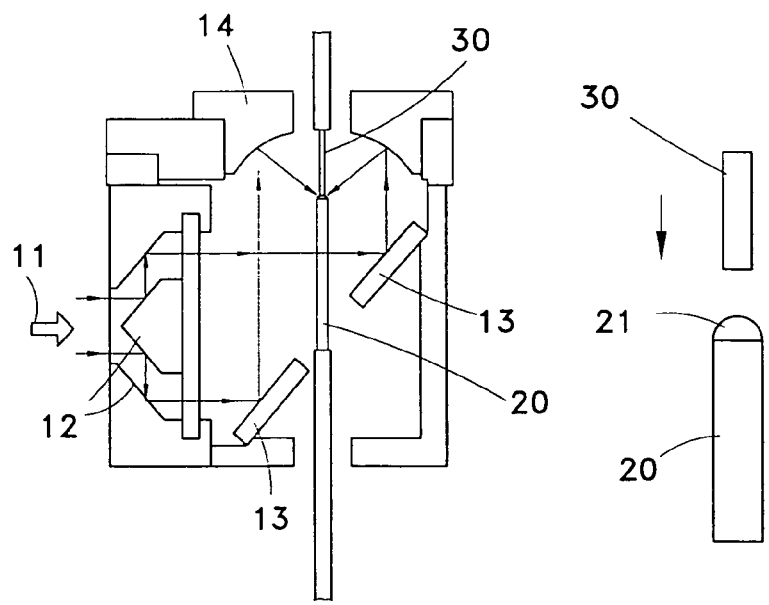
FIG. 1 shows a schematic drawing of an apparatus for fabricating a $Cr^{4+}$:YAG crystal fiber according to the laser-heated pedestal growth apparatus of the present invention.
FIG. 2 is a schematic drawing showing the grown procedure of the crystal fiber according to the present invention.

FIG. 1 is a schematic drawing showing an apparatus for fabricating a crystal fiber according to the LHPG method. $CO_2$ laser beam 11 provided by a $CO_2$ laser generator (not shown) is emitted to a beam splitter 12 such that the $CO_2$ laser beam is split into a generally annular beam. A bending mirror 13 is used to reflect the annular beam from the beam splitter 12 and to project it to a paraboloidal mirror 14. The paraboloidal mirror 14 is used to reflect the annular beam from the bending mirror 13 and to focus the annular beam on one end of a source crystal rod 20, which is YAG crystal doped with $Cr^{4+}$ ions. Referring to FIG. 2, the end of the source crystal rod 20 can be melted to form a molten zone 21 by the laser beam 11. An oriented seed 30 is fed downward to dip in the molten zone 21, and then the oriented seed 30 is pulled upward slowly, while the source crystal rod 20 is fed toward the molten zone 21 so that a new grown crystal core 40 is formed at the end of the oriented seed 30, wherein the crystal orientation of the new grown crystal core is the same as that of the oriented seed 30. Different ratio of the pull speed of the oriented seed 30 to the feed speed of the source crystal rod 20 determines the diameter of the new grown crystal fiber 40. For example, if the ratio of the pull speed of the oriented seed 30 to the feed speed of the source crystal rod is 16:1, the diameter ratio of the new crystal fiber 40 to the source crystal rod is 1:4.

Figures 3, 4:
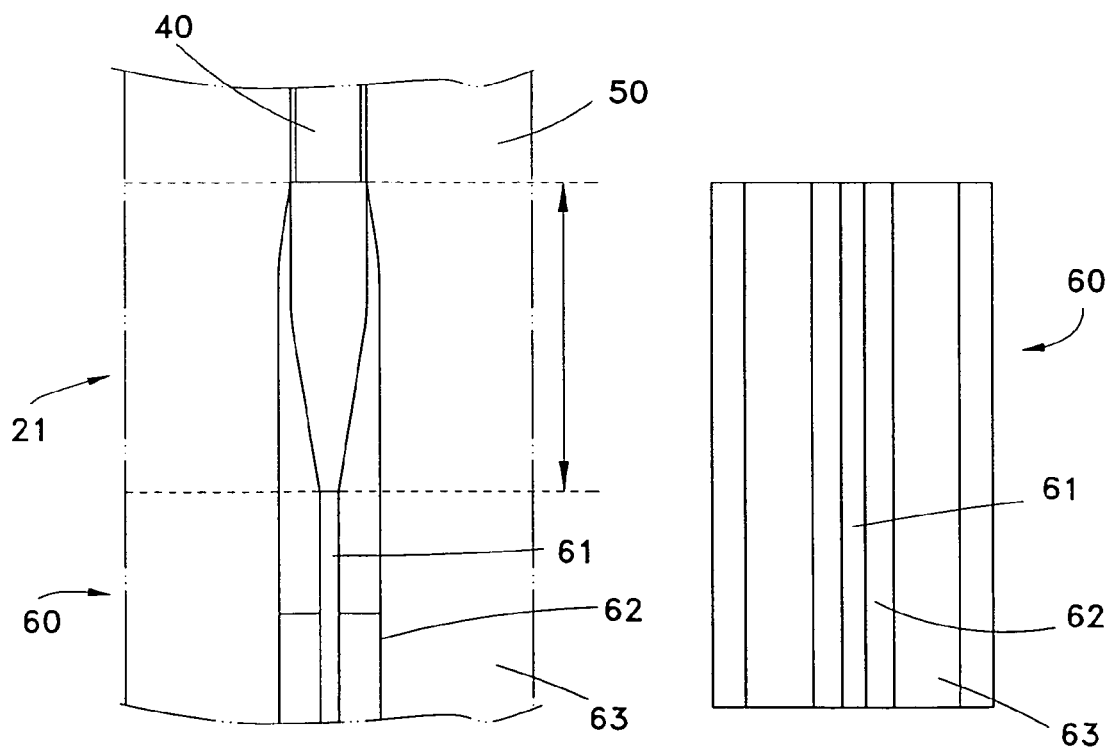
FIG. 3 shows a schematic drawing of a molten zone during growth.
FIG. 4 is a cross-sectional view of the grown double-clad $Cr^{4+}$:YAG fiber.

FIG. 3 is a schematic drawing showing the cladding step according to the CDLHPG method. A $Cr^{4+}$:YAG crystal fiber having a diameter of 68 μm made by the above-mentioned LHPG method is inserted into a fused silica tube 50 having an inner diameter of 76 μm. The fused silica tube 50 thus obtained is heated by the laser beam of the LHPG system to downwardly grow a double-clad crystal fiber 60. The method is called codrawing laser-heated pedestal growth (CDLHPG) method. By controlling suitable growth factor of the CDLHPG method, a double-clad crystal fiber enclosed by fused silica can be achieved. As shown in FIG. 4, the double-clad crystal fiber thus obtain has a $Cr^{4+}$:YAG crystal core 61, an inner cladding 62 and an outer cladding 63.

Figure 5:
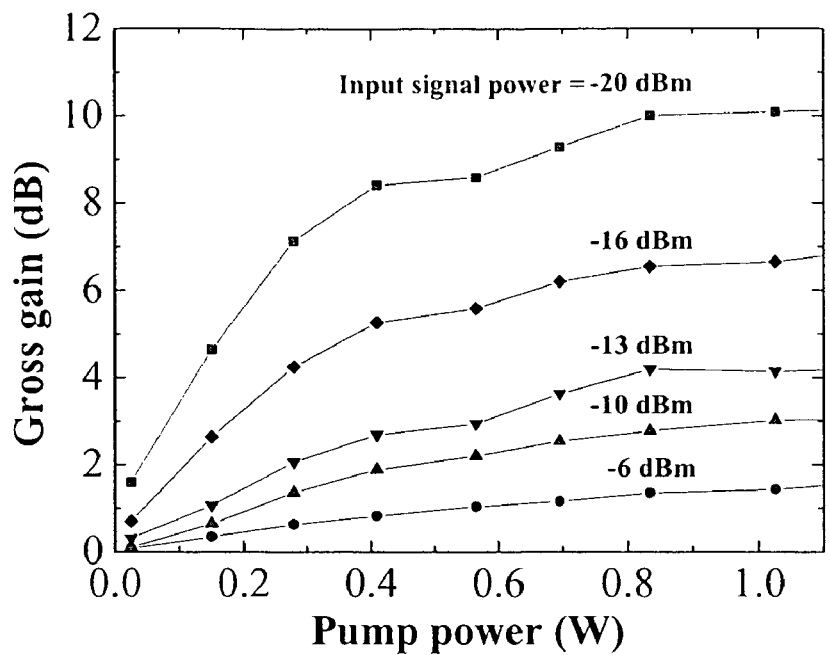
FIG. 5 is a plot showing the relationship between the gross gain and the pumping power subject to various input signal powers.

The diameters of the core 61, the inner cladding 62 and the outer cladding 63 are 25 μm, 100 μm and 320 μm respectively. In the measurement of gross gain, a 1064 nm Yb-fiber laser is used as a pump source. The pump beam is guided into a signal mode fiber by a coupled lens and combined with 1520 nm signal beam through an optical coupler, such as a wavelength-division-multiplexing (WDM) coupler, and the optical coupler output is spliced to the double-clad crystal fiber by a fusion splicer. The signal light from the output of the double-clad crystal fiber was concentrated by a 10 mm-focus lens. The unabsorbed pumping light was filtered by a filter at a wavelength of 1064 nm, and than the gross gain is determined under different signal input power. The definition of the gross gain is the gain of the output signal power with pumping to the output signal power without pumping, and the contribution of the amplified spontaneous emission (ASE) has to be of course subtracted. The result of the measurement is shown in FIG. 5. As shown in FIG. 5, the gross gain of 10 dB is obtained at the pump power of 0.83 W under the input signal power of −20 dBm.

On the application of the amplifier, the propagation directions of the pumping light and the outputted amplified signal light can be controlled to be same or reverse. In order to transit a signal light or pumping light in a single direction, or to prevent the reflected light caused by connection of optical elements from interfering with the signal light or pumping light, an optical isolator can be provided at the output end of the transition metal doped fiber or at the input end of the optical coupler for signal light passing. The optical isolator is but not limited to a Faraday isolator.

Figure 6:
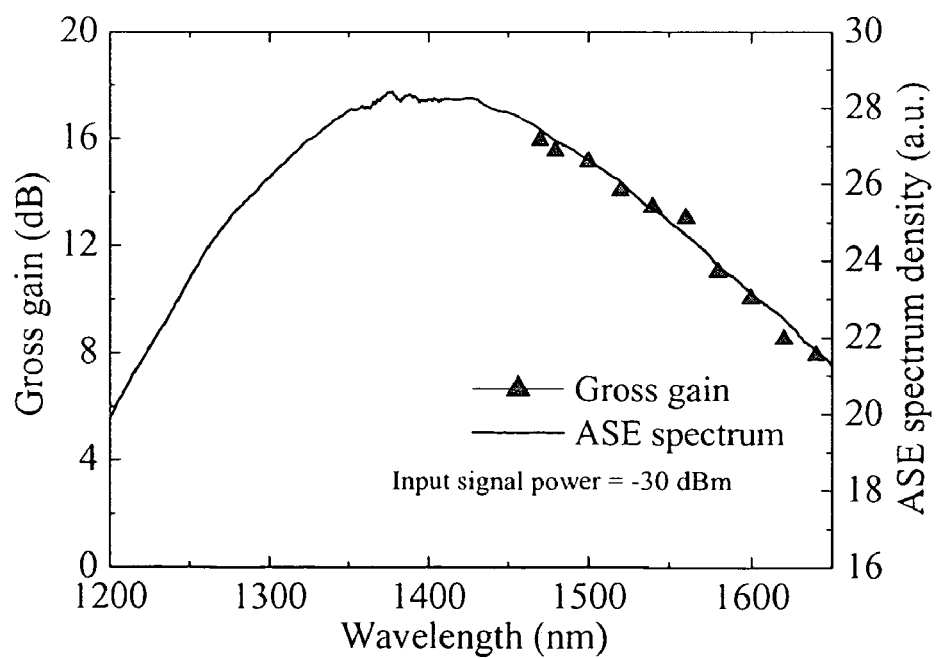
FIG. 6 is a plot showing the gross gain and the ASE spectrum at different signal wavelength.

Besides, the gross gains to various wavelengths of the input signal lights under the pump power of about 1 W are measured. As shown in FIG. 6, the gross gain of 16 dB is obtained at the signal wavelength of 1.47 μm. The bandwidth of the optical amplifier of the present invention that is calculated by comparing the measured gross gain and the ASE spectrum is about 270 nm.

$Cr^{4+}$:YAG crystal fiber used in the above-mentioned embodiment has a strong spontaneous emission that just covers the low-loss-window of the optical fiber. The crystal fiber has a 270 nm bandwidth under a 3-dB gain condition and a 400 nm bandwidth under a 6-dB gain condition. This covers the O-band, E-band, S-band, C-band, and L-band of the optical communication. The bandwidth of the transition metal doped fiber amplifier of the invention is far widely than that of the traditional erbium-doped fiber amplifier. In addition, the absorption spectrum of the fiber amplifier of the present invention ranges from about 0.9 μm to about 1.2 μm so that the fiber amplifier of the invention is compatible with the pumping light of 0.98 μm used by the well-known erbium-doped fiber amplifier (EDFA).

Presently it needs to connect plural amplifiers to widen band, and no one single amplifier can fully cover the whole 1.3-1.6 μm of optical communication. Under limited bandwidth the dense wavelength division multiplex has chock point about increasing channels and results in fabricating difficultly. The gain bandwidth of the transition metal doped optical fiber amplifier of the present invention is about ten times than that of a traditional erbium-doped fiber amplifier. One single transition metal doped optical fiber amplifier of the present invention can cover the whole 1.3-1.6 μm of optical communication, including the low loss band around 1.4 μm. The present invention improves the disadvantage of connecting plural amplifiers for covering the whole optical communication band in the art. In addition, since the main material of the double-clad fiber is fused silica, the fiber of the present invention can be connected to the fibers currently used by fusion directly, eliminating the inconvenience of using optical coupling devices. The optical amplifier of the present invention can replace the currently existing system and has a very high useful value.

What is claimed is:

1. An optical amplifier comprising:
   an optical fiber comprising:
   a single crystalline core doped with transition metal ions, and an inner cladding and an outer cladding enclosing the core wherein the single crystal core is made from a material selected from a group consisting of $Y_3AL_5O_{12}$ and garnets and the inner cladding is made by a material selected from the group consisting of $Y_3AL_5O_{12}$ and silica.

2. An optical amplifier as defined in claim 1, wherein said inner cladding is made by the mixtures of core and outer cladding.

3. An optical amplifier as defined in claim 1, wherein said inner cladding has a thickness of between about 10 nm to about 500 pm.

4. An optical amplifier as defined in claim 1, wherein said outer cladding has a thickness of beyond about 10 μm.

5. An optical amplifier as defined in claim 1, wherein said cladding is made from a material selected from the group consisting of fused silica and compounds thereof.

6. An optical amplifier as defined in claim 1, wherein the material of the core is a single crystal material doped with $Cr^{4+}$ or a poly crystal material doped with $Cr^{4+}$.

7. An optical amplifier as defined in claim 1, wherein the material of the core is a single crystal material doped with $V^{3+}$ or a poly crystal material doped with $V^{3+}$.

8. An optical amplifier as defined in claim 1, wherein the material of the core is a single crystal material doped with $Ni^{2+}$ or a poly crystal material doped with $Ni^{2+}$.

9. An optical amplifier as defined in claim 1, wherein the material of the core is a single crystal material or a poly crystal material doped with ions selected from the group consisting of $Cr^{4+}$, $V^{3+}$, $Ni^{2+}$ and the combinations thereof.

10. An optical amplifier as defined in claim 1, including a pumping light source providing a pumping light of 0.8-1.2 μm in wavelength.

11. An optical amplifier as defined in claim 1, having a band ranging from 1.2 μm to 1.65 μm at a gain of 3 dB.

12. An optical amplifier as defined in claim 1, further comprising:
   an optical wideband coupler coupled to an end of the optical fiber; and
   an optical wideband isolator coupled to the other end of the optical fiber.

13. An optical amplifier as defined in claim 10, wherein a pumping light and an amplified signal light are propagated in the optical fiber in same or reverse propagation direction.

* * * * *